June 15, 1943. W. C. EDDY 2,321,901
COLLAPSIBLE DOLLY
Filed Feb. 15, 1941
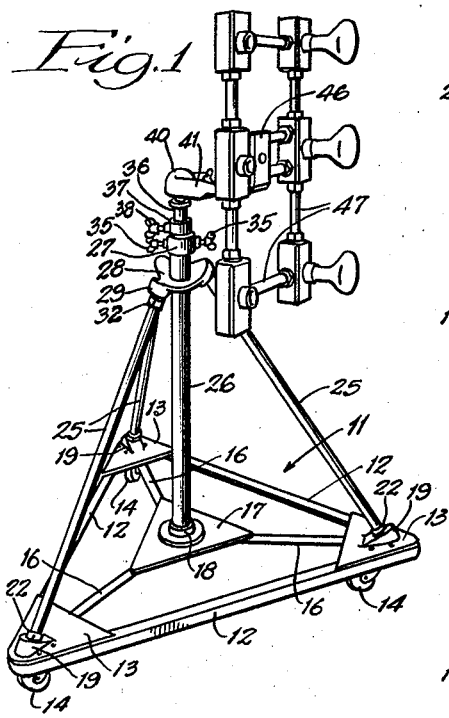
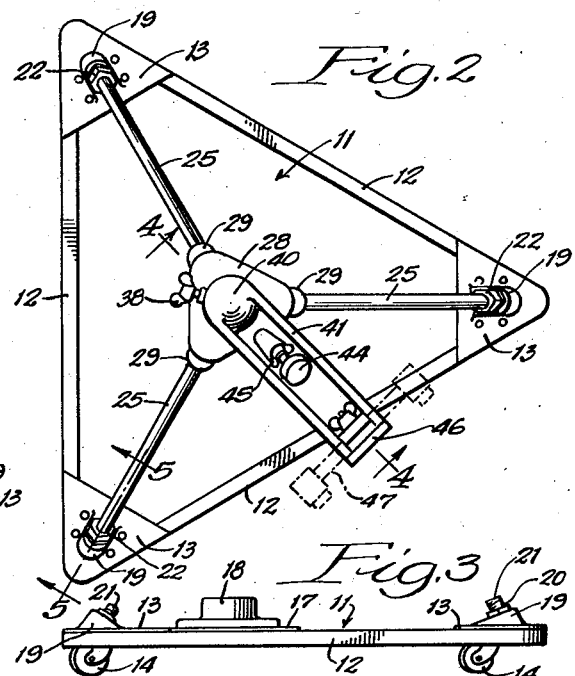
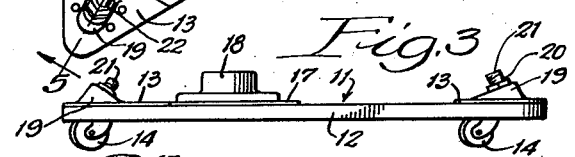
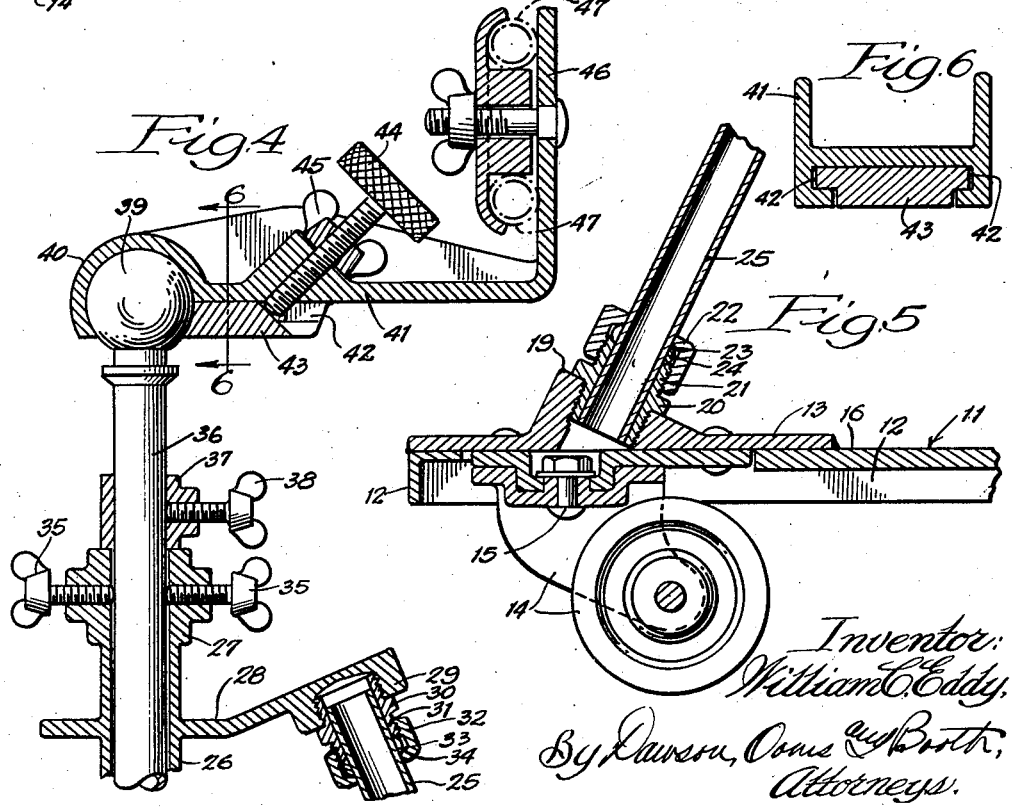
Inventor:
William C. Eddy,
By Dawson, Ooms and Booth,
Attorneys.

Patented June 15, 1943

2,321,901

UNITED STATES PATENT OFFICE 2,321,901

COLLAPSIBLE DOLLY

William C. Eddy, Kenilworth, Ill., assignor to Balaban & Katz Corporation, Chicago, Ill., a corporation of Delaware Application February 15, 1941, Serial No. 379,003

3 Claims. (Cl. 248—186)

This invention relates to portable dollies and more particularly to dollies employed as mounts for lights for the illumination of scenes for photography or television projection.

One of the objects of the invention is to provide a dolly which can be made to sustain a substantial load, but nevertheless can be collapsed into a few standard flat parts which can be readily carried about.

A further object of the invention is to provide a dolly which can be easily and cheaply manufactured from familiar structural materials and can be collapsed and reassembled without the use of any special tools.

A further object of the invention is to provide a dolly capable of a variety of adjustments so that any lighting fixtures mounted thereupon can be moved into a wide range of positions.

A further object of the invention is to provide a dolly with a broad base to provide firm support for the apparatus mounted thereupon, but which is nevertheless light in weight and simple in construction.

Other objects, advantages and capabilities of the invention will appear from the following description of a preferred embodiment thereof, taken in conjunction with the accompanying drawing, in which:

Figure 1 is a perspective view of a dolly of this invention on which are mounted a bank of lights employed for the illumination of scenes to be photographed or projected by television;

Fig. 2 is a plan view of the dolly shown in Fig. 1;

Fig. 3 is an elevation of the base of the dolly of this invention;

Fig. 4 is a fragmentary sectional view of the head and bracket of the dolly of this invention, taken on the line 4—4 of Fig. 2;

Fig. 5 is a fragmentary section of one corner of the base of the dolly of this invention, taken on the line 5—5 of Fig. 2; and Fig. 6 is a fragmentary section of a portion of the bracket socket, taken on the line 6—6 of Fig. 4.

Referring to the drawing (Fig. 1), the base of the dolly is indicated by the numeral 11. While it may be made in circular, square, or other forms, it is preferably made in triangular form to provide the greatest strength for the size of the device. In the preferred embodiment shown, the base comprises the three side rails 12, joined into the form of an equilateral triangle by means of the corner plates 13. The side rails may be made from familiar angle iron rails. Beneath each corner is mounted a caster 14 of familiar construction which may be secured to the base by means of the bolts 15 (see Fig. 5).

Extending from each corner of the dolly are the rails 16 which project to the center of the dolly and there sustain the central plate 17, upon which is mounted a socket 18. Obviously, in place of the rails 16 and the central plate 17 the base may be made of a single solid sheet incorporating the corner plates 13 and the central plate 17, although this modification will involve increased weight which is not desirable in a portable device.

At each corner of the dolly is mounted a socket 19. In the embodiment shown this socket is threaded on the interior to receive the nipple 20 which is threaded into the socket 19 and has an exteriorly threaded portion 21 which projects upwardly to receive the threaded collar 22. It is to be observed that the end of the threaded portion 21 of the nipple is cammed on its inner face and that the collar 22 has a complementary cammed surface 23. Between the cammed face of the nipple 20 and the cammed face 23 of the collar 22 is the split ring 24 which may be compressed between the two cammed surfaces and tightened about the strut 25 which projects from the socket 19, to grip the strut. The couplings and struts are identical and readily interchangeable.

Rising vertically from the socket 18 of the central plate 17 of the caster base 11 is the shaft 26, which is shown in the drawing as a hollow pipe seated in the socket 18 and terminating at its upper end in the collar 27, beneath which is secured the dolly head 28. The dolly head 28 is shown made integral with the shaft 26, although obviously it can be made separately and secured thereto by any familiar means. The head 28 is generally triangular in form and bears at each of its corners an inverted socket 29 fitted with a nipple 30. This nipple 30, like that previously designated by the numeral 20, forms part of a compression coupling composed of the exteriorly threaded portion 31, cammed on the interior face, the threaded collar 32, the cam face 33 thereon, and the split ring 34.

The collar 27 which forms the upper terminal of the shaft 26 is provided with one or more thumb screws 35 which may be employed to lock the solid shaft 36 in position within the shaft 26. Also surrounding the shaft 36 is the collar 37 provided with the thumb screw 38 by which the collar 37 may be adjustably secured in position upon the shaft 36.

The shaft 36 terminates in the ball 39, which, with the socket 40 upon the bracket 41, forms a ball-and-socket joint. The bracket 41 is formed upon its lower surface with the channel 42 to receive the tongue 43 which can be moved horizontally upon the bracket by the knurled knob 44 to compress the ball 39 within the socket 40 to lock the bracket 41 in any one of a universal range of positions with respect to the shaft 36. The screw upon the knurled knob 44 may be locked in position by means of the wing nut 45.

The bracket 41 may be made in a number of shapes depending upon the type of apparatus which the dolly is designed to bear. In the embodiment shown in the accompanying drawing the bracket 41 terminates in a vertical clamp 46 which has been shown supporting a lamp bank 47.

The device of this invention is intended to permit the ready disassembly and reassembly of these dollies for the purpose of transportation and storage. In order to sustain devices such as the lamp bank shown in the accompanying drawing, it is necessary that the dolly have a rather extended base in order that when the lamp bank or other apparatus borne by the dolly is adjusted into various positions the device will not be readily upset. Because of the broad base, the structure, if not collapsible, becomes rather unwieldy for the purposes of transportation and storage. By means of this invention it is possible to make the dollies in a form which permits them to be readily disassembled and stored in a number of flat and easily handled parts. This disassembly and reassembly can be easily effected without the use of any special tools.

Operation of the invention

Assuming the collapsible dolly to be in the form and assembled condition of that shown in Fig. 1, in order to disassemble the device, it is only necessary to open the clamp 46 and remove the lamp bank 47. Thereupon the compression coupling at the end of each strut may be released by rotation of the collars 22 and 32 which will relieve the split rings 24 and 34 and free the struts from the sockets 19 and 29. The head 28, with the attached hollow shaft 26 and the shaft 36, can thereupon be lifted from the dolly and the struts lifted from the sockets 19.

By this simple operation the dolly is broken down into the base 11, the three strut members 25 and the head assembly 28, which includes the shafts 26 and 36 and the bracket 41.

As the coupling parts and struts are identical and interchangeable, similar parts can be stored together and the dollies reassembled from a common store of parts.

To reassemble the device it is only necessary to replace the struts in the sockets 19 and 29 and the shaft 26 in the socket 18 and to tighten the compression couplings 22 and 32. Thereupon the shaft 36 can be vertically adjusted by loosening of the thumb screws 35 and the lifting of the shaft 36 within the hollow shaft 26. If it is desired to maintain the shaft 36 rotatable, the thumb screws 35 can be left in released position and the collar 37 dropped about the shaft 36 until it bears upon the collar 27, whereupon the thumb screw 38 can be tightened. Inasmuch as the collar 37 is independent of the collar 27, the shaft 36 can thereupon be rotated within the shaft 26.

The angular position of the bracket 41 with respect to the shaft 36 can be readily adjusted by releasing the wing nut 45 and the knurled knob 44, which will relieve the plate 43 and socket 40 from frictional engagement with the ball 39 and permit the joint formed by the ball 39 and the socket 40 to be employed as a ball-and-socket joint. When the bracket 41 is placed in the desired position with respect to the shaft 36 it can be locked in that position by means of the knurled knob 44 and the wing nut 45.

Although this invention has been disclosed in connection with the specific details of a preferred embodiment thereof, it is to be understood that such details are not intended to be limitative of the invention except insofar as set forth in the accompanying claims.

Having described my invention, what I claim as new and desire to secure by Letters Patent is:

1. A collapsible dolly comprising a rigid base, a socket upon said base, a shaft removably supported in said socket, a head upon said shaft, a plurality of struts interposed between said base and said head, and coupler means upon said base and head by which said struts may be removably secured thereto, said coupler means each comprising a split ring surrounding each strut and means engageable with said base to compress the split ring about the strut.

2. A collapsible dolly comprising a base, a socket upon said base, a shaft supported in said socket, a head upon said shaft, a plurality of struts interposed between said base and said head, coupler means upon said base and head by which said struts may be removably secured thereto, said coupler means each comprising a socket to receive the end of a strut, a thread upon the exterior of said socket, a threaded collar about said socket, said socket and said collar being provided with complementary cam surfaces, and a split ring encircling the strut and compressible between the cam surfaces of said collar and said socket.

3. In a collapsible dolly equipped with a base and with a vertically adjustable shaft extending upwardly with respect to said base, a ball on said shaft, a bracket surmounting said ball, a socket in the bracket removably receiving the upper portion of the ball to permit a universal range of movement of said bracket with respect to said ball, a channel in the bracket adjacent the lower portion of the ball, a tongue slidably received in said channel with the end of the tongue adapted to be brought into engagement with the lower portion of the ball to secure the socket to the ball and to lock the bracket in fixed position with respect to the ball, means for moving said tongue in the channel to bring the same into engagement with the ball, and means for locking said moving means.

WILLIAM C. EDDY.